June 12, 1928.  W. W. POTTER  1,673,088
MACHINE TOOL
Filed Dec. 11, 1923   13 Sheets-Sheet 1
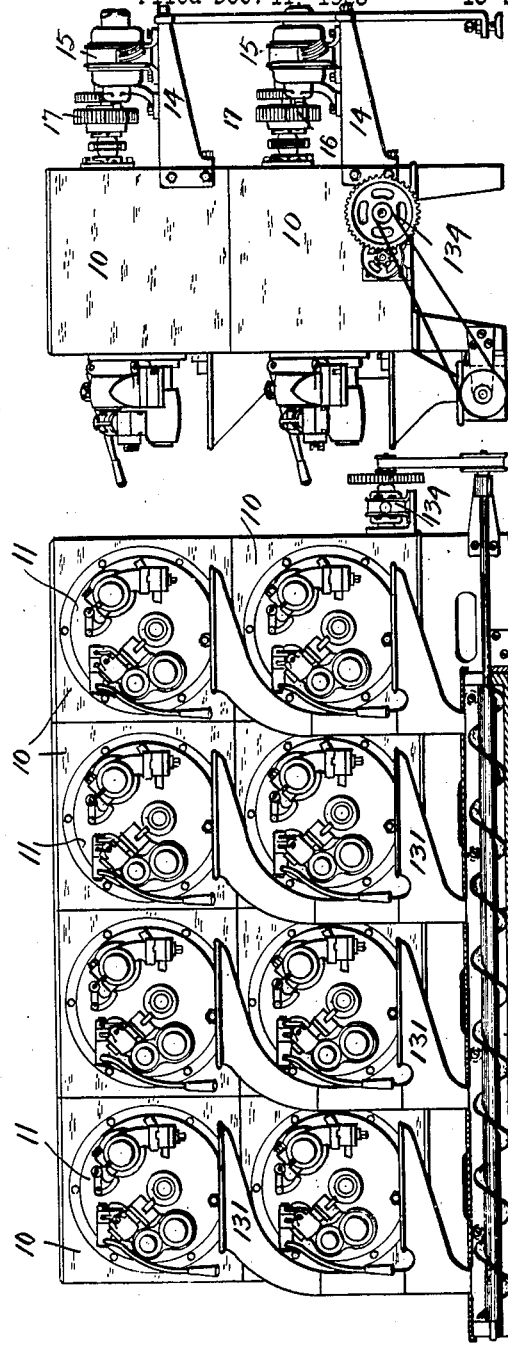
INVENTOR
W. W. Potter
BY
Chas. J. Williamson
ATTORNEY

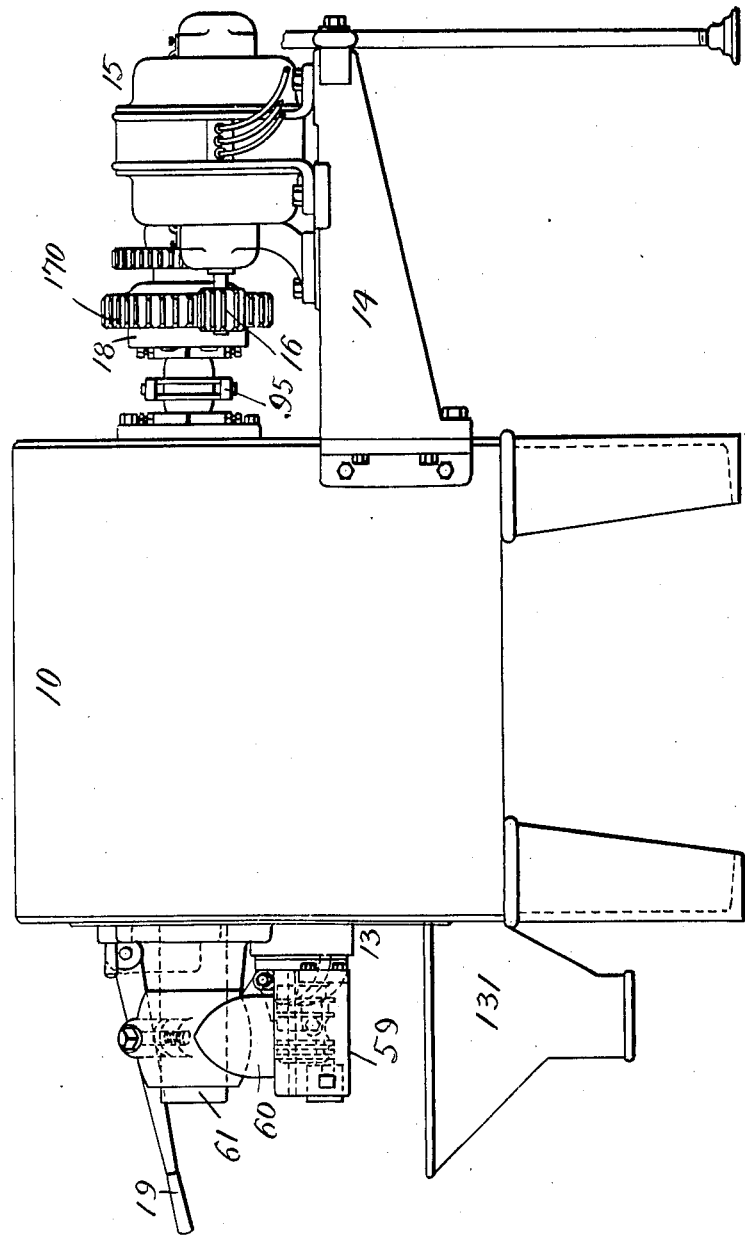

June 12, 1928.

W. W. POTTER 1,673,088

MACHINE TOOL

Filed Dec. 11, 1923  13 Sheets-Sheet 3

INVENTOR
W. W. Potter
BY Chas. J. Williamson
ATTORNEY

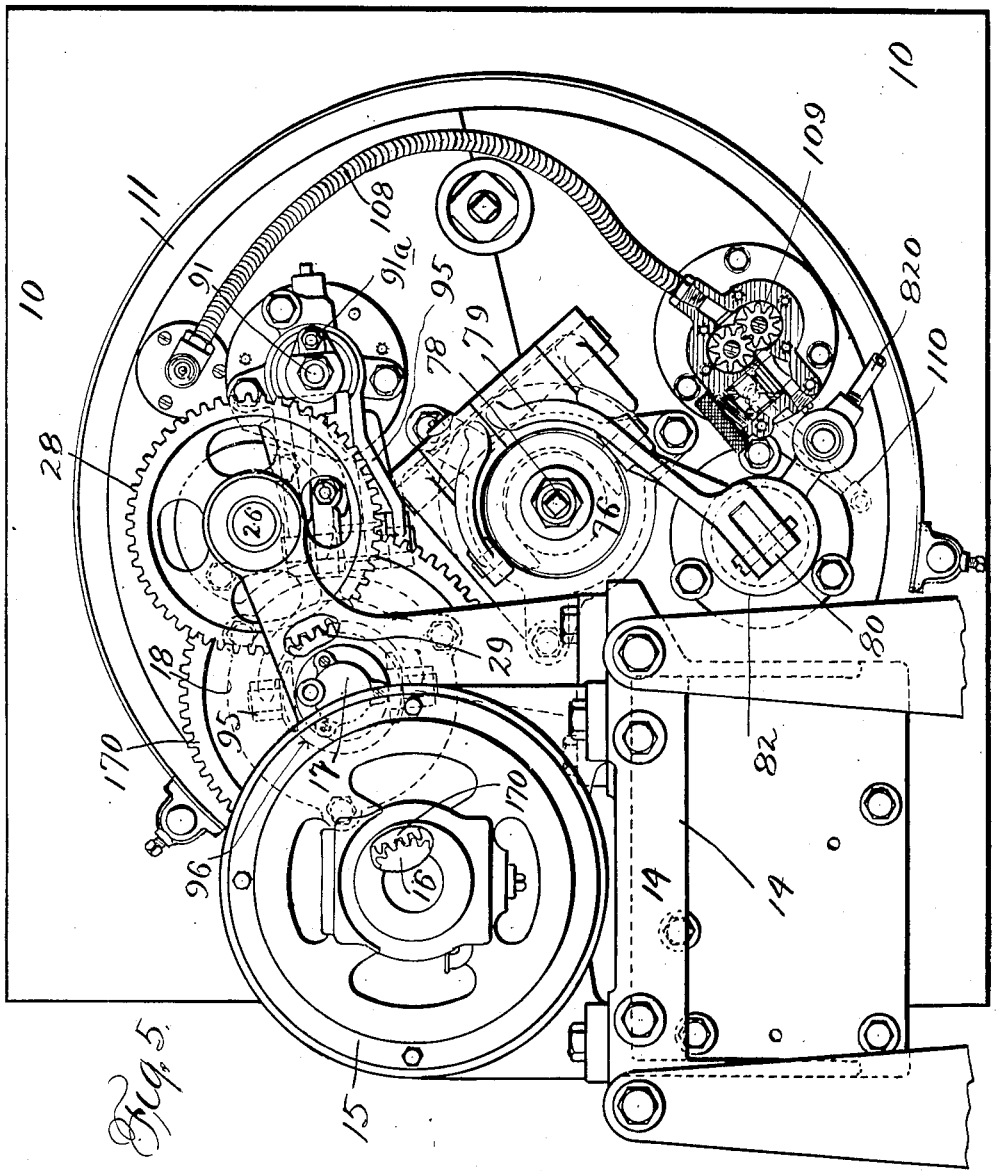

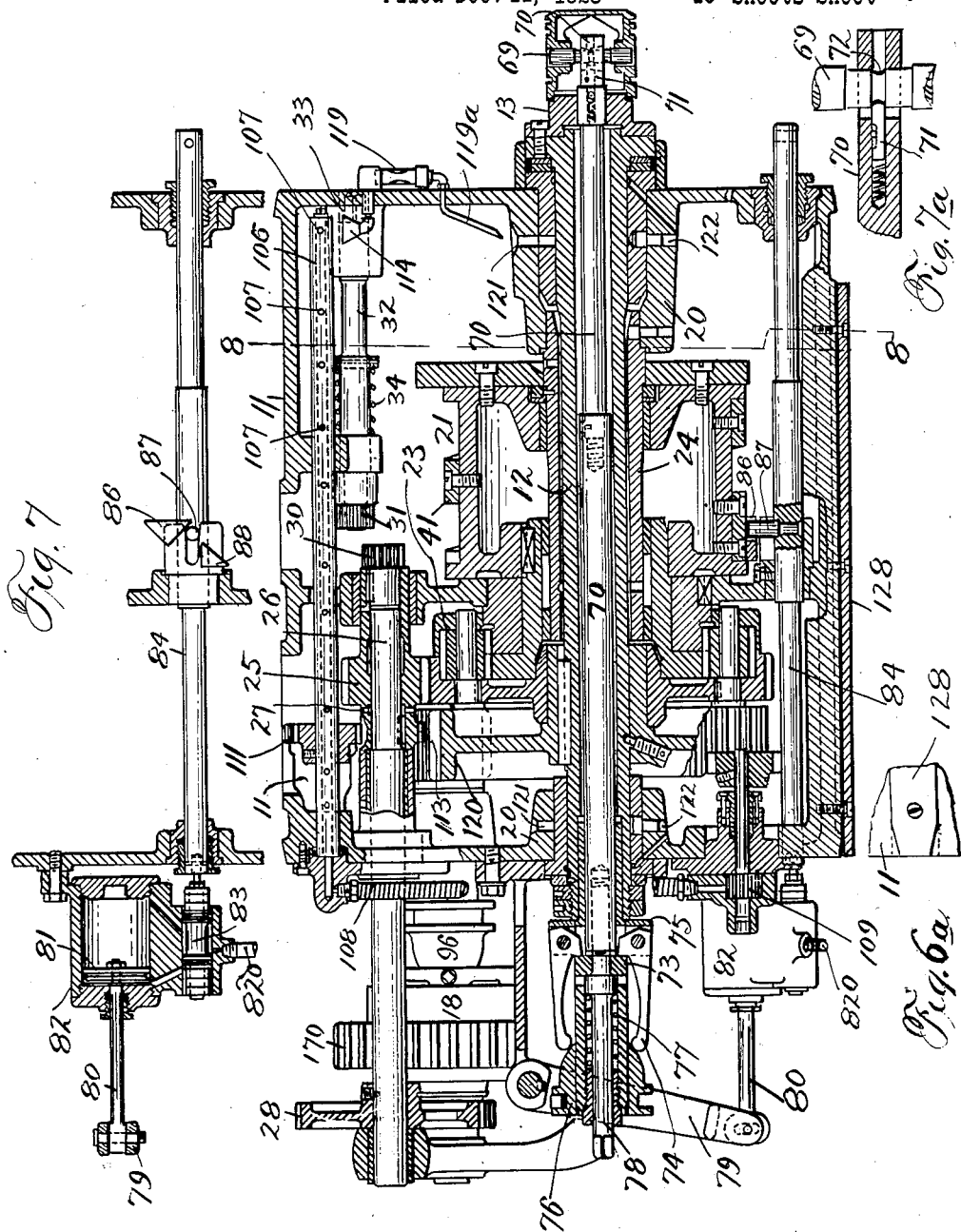

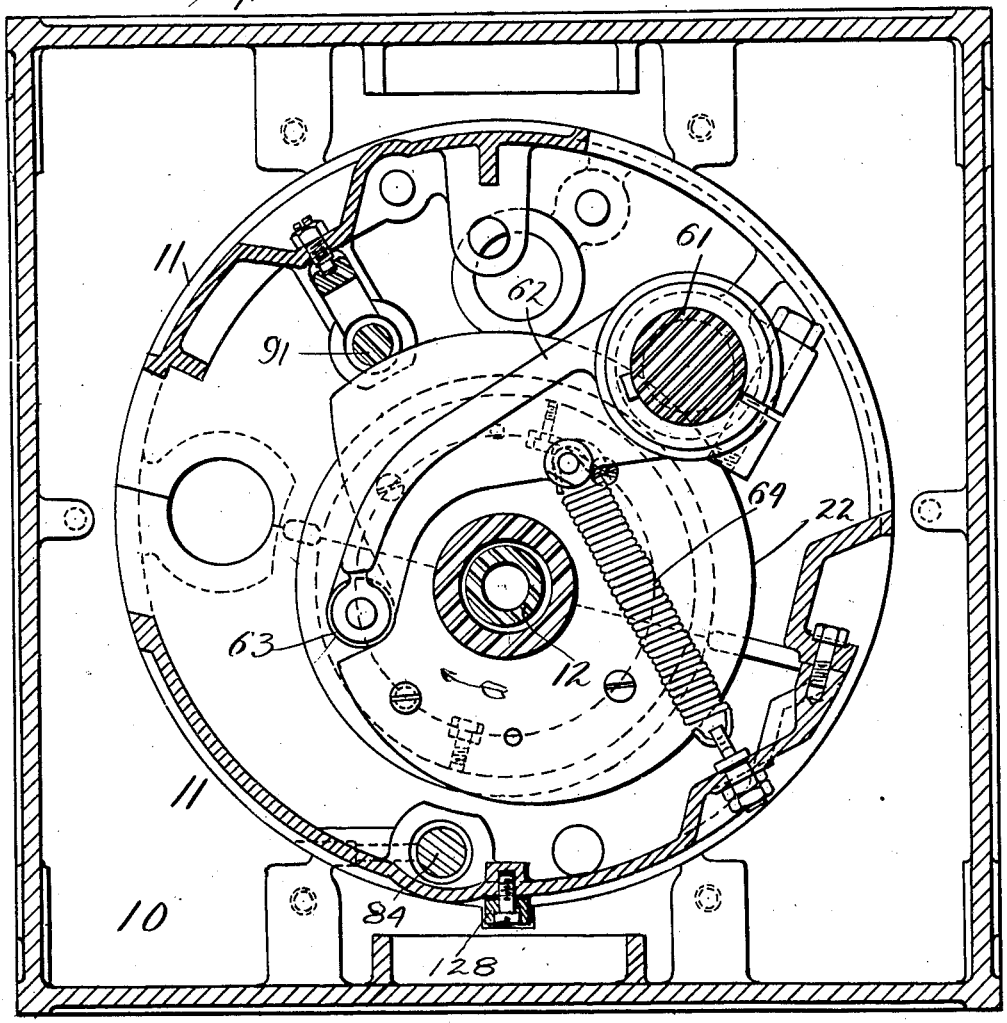

June 12, 1928. 1,673,088
W. W. POTTER
MACHINE TOOL
Filed Dec. 11, 1923  13 Sheets-Sheet 7
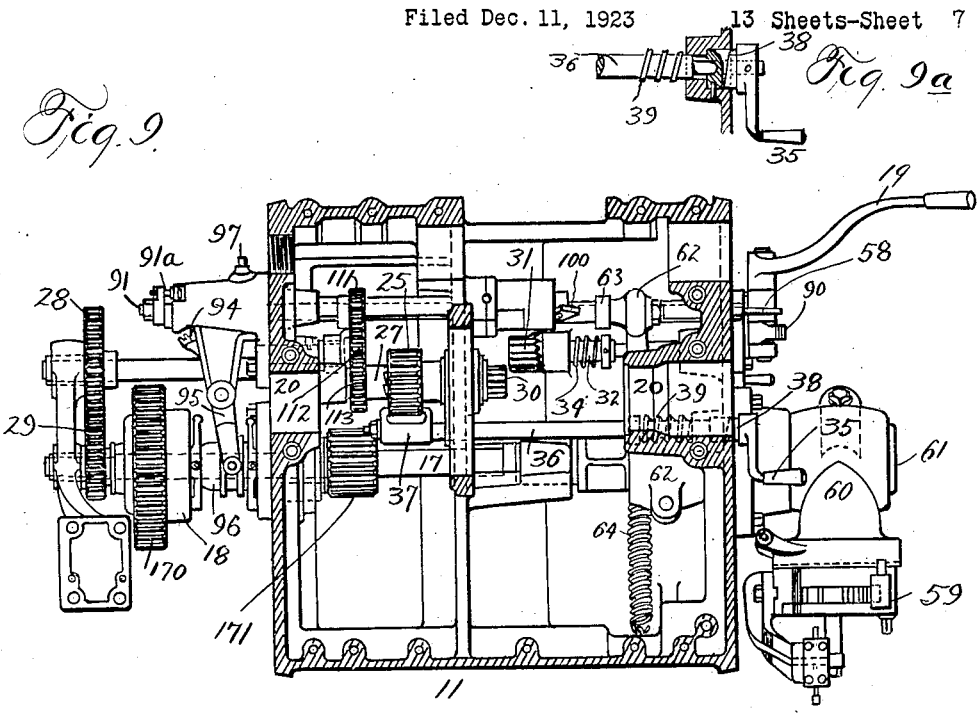
Fig. 9
Fig. 9a
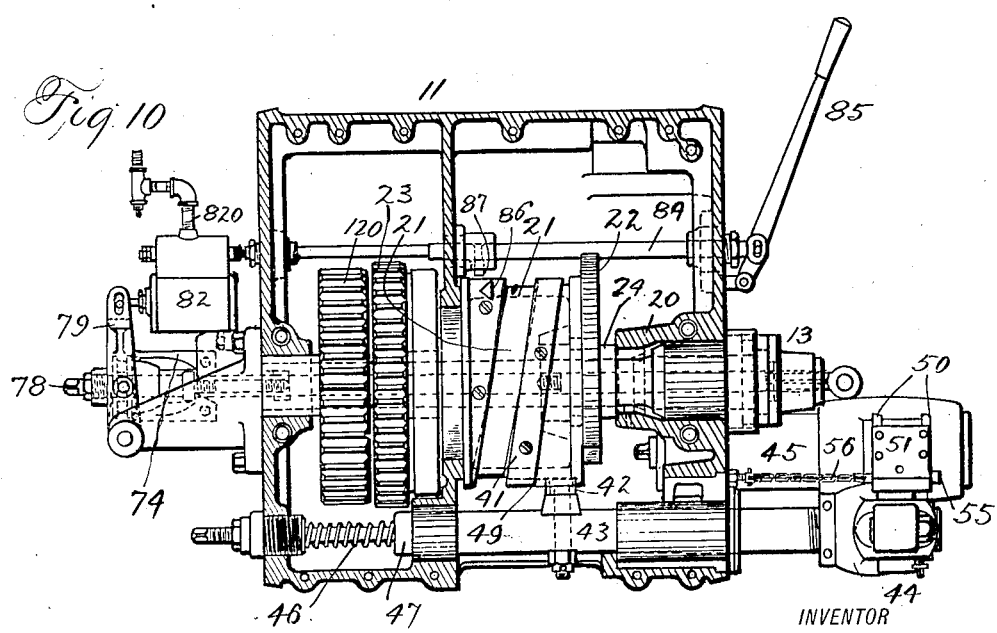
Fig. 10
INVENTOR
W. W. Potter
BY
Chas. J. Williamson
ATTORNEY June 12, 1928.
W. W. POTTER
1,673,088
MACHINE TOOL
Filed Dec. 11, 1923
13 Sheets-Sheet 8
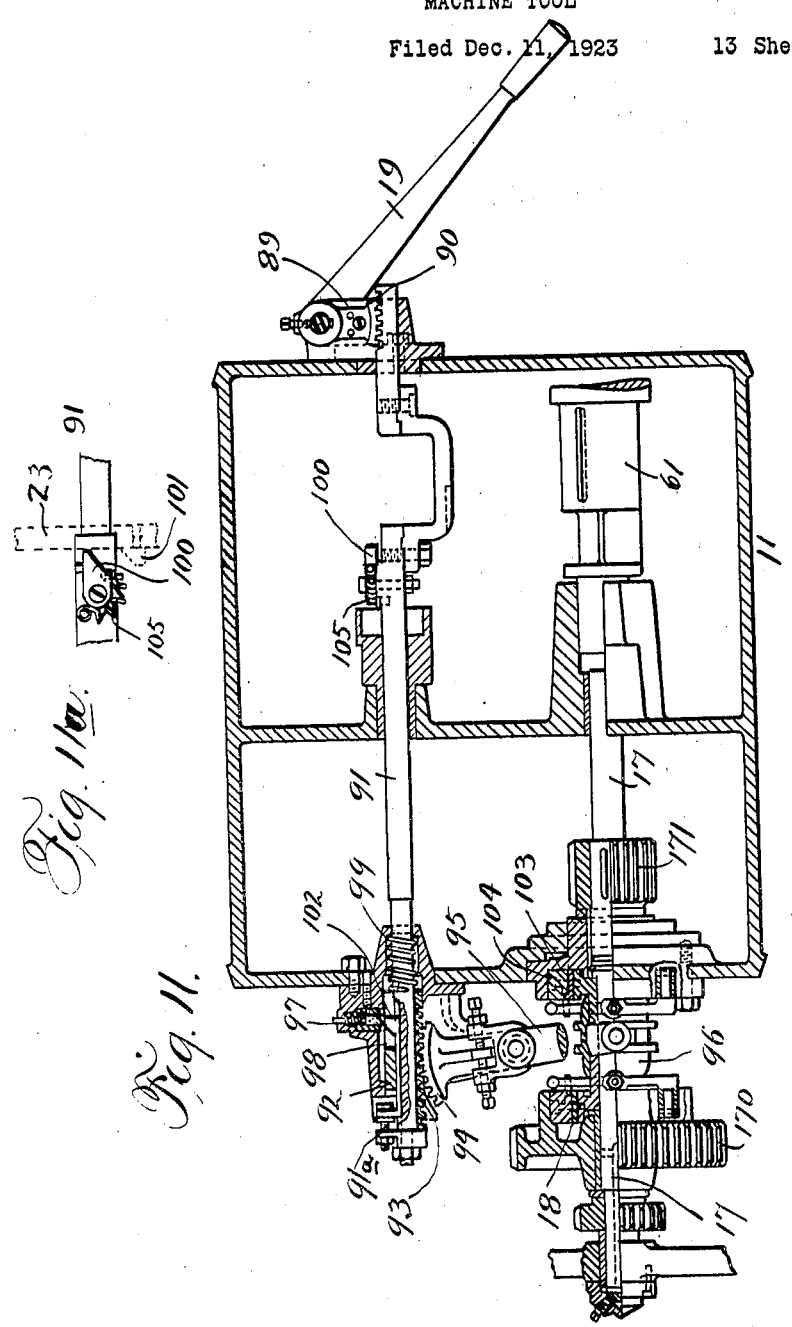

June 12, 1928.  W. W. POTTER  1,673,088
MACHINE TOOL
Filed Dec. 11, 1923  13 Sheets-Sheet 9
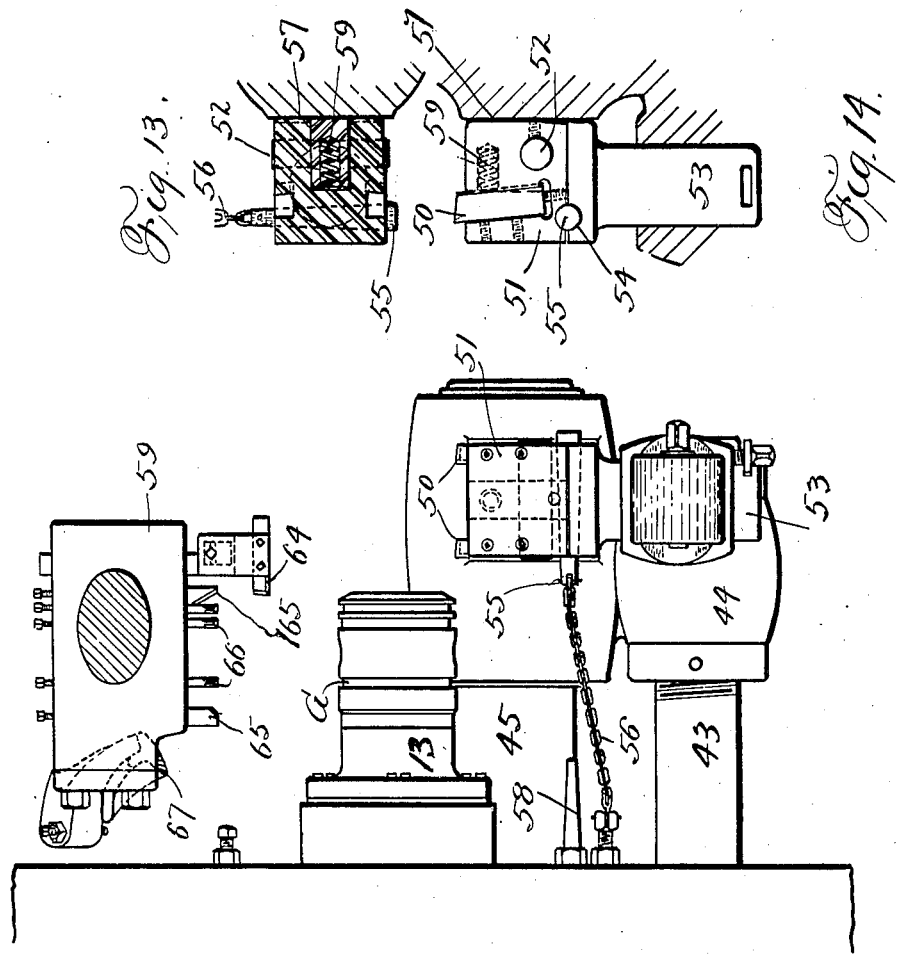

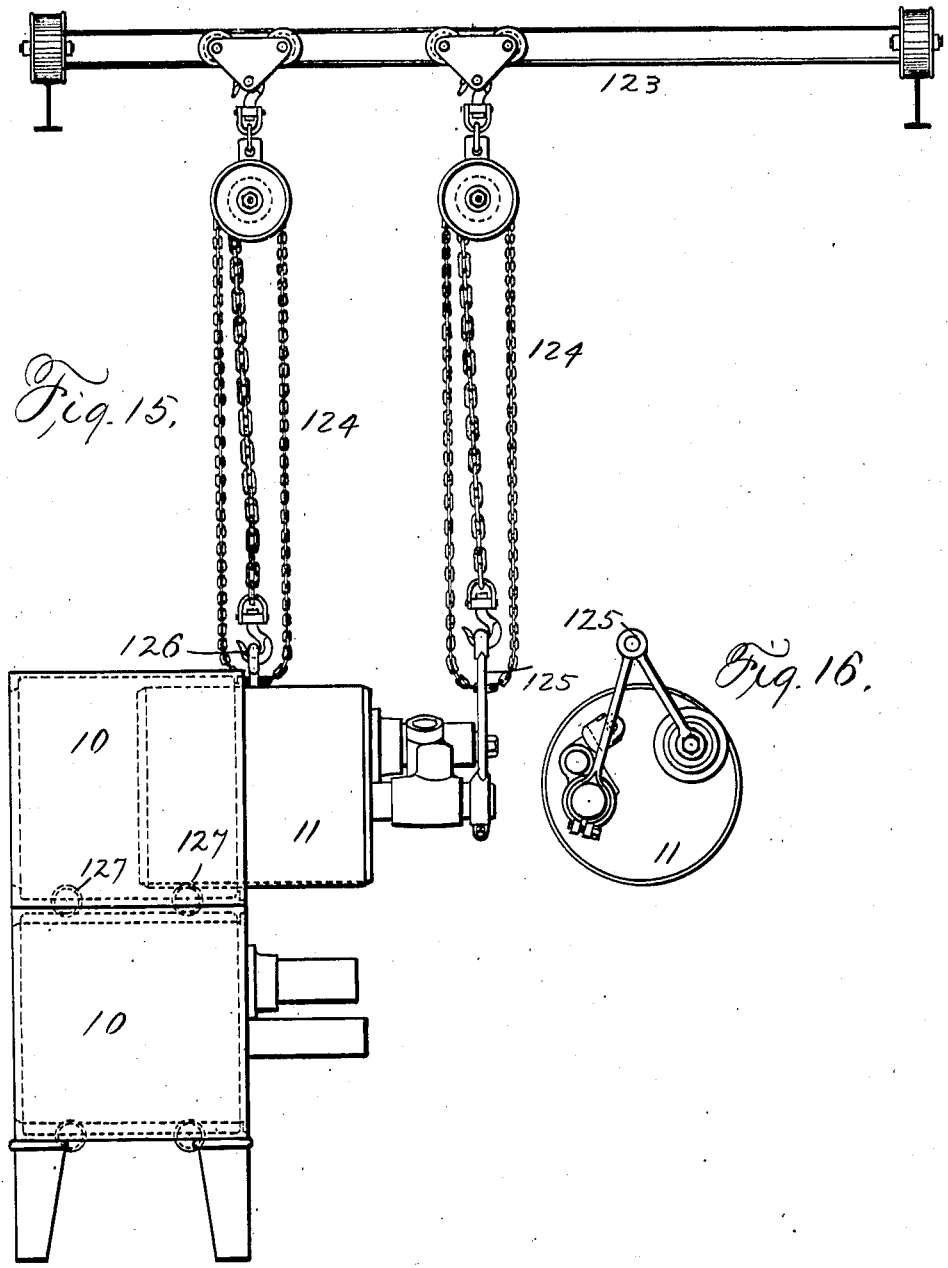

June 12, 1928.  W. W. POTTER  1,673,088
MACHINE TOOL
Filed Dec. 11, 1923   13 Sheets-Sheet 11
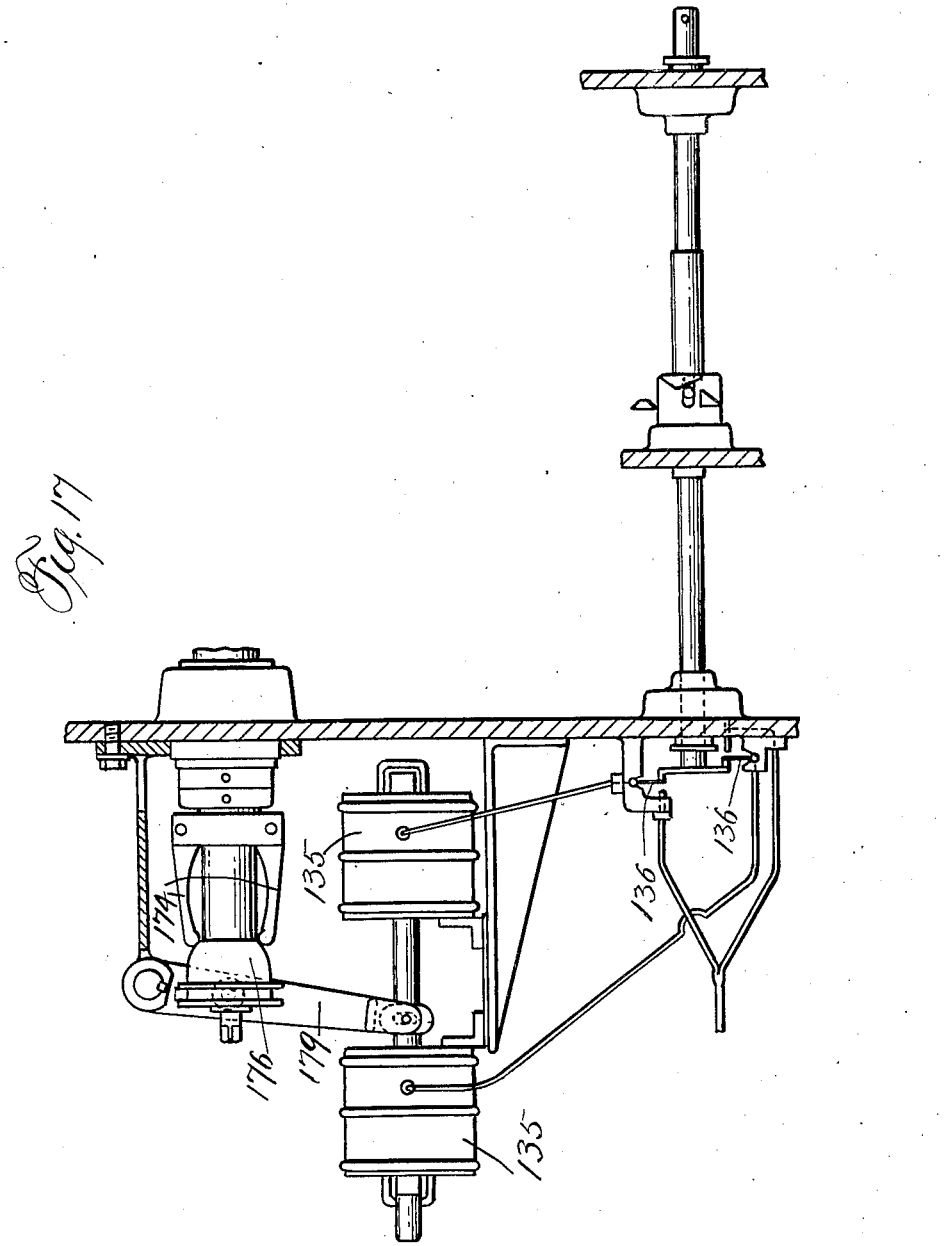

June 12, 1928. 1,673,088
W. W. POTTER
MACHINE TOOL
Filed Dec. 11, 1923   13 Sheets-Sheet 12
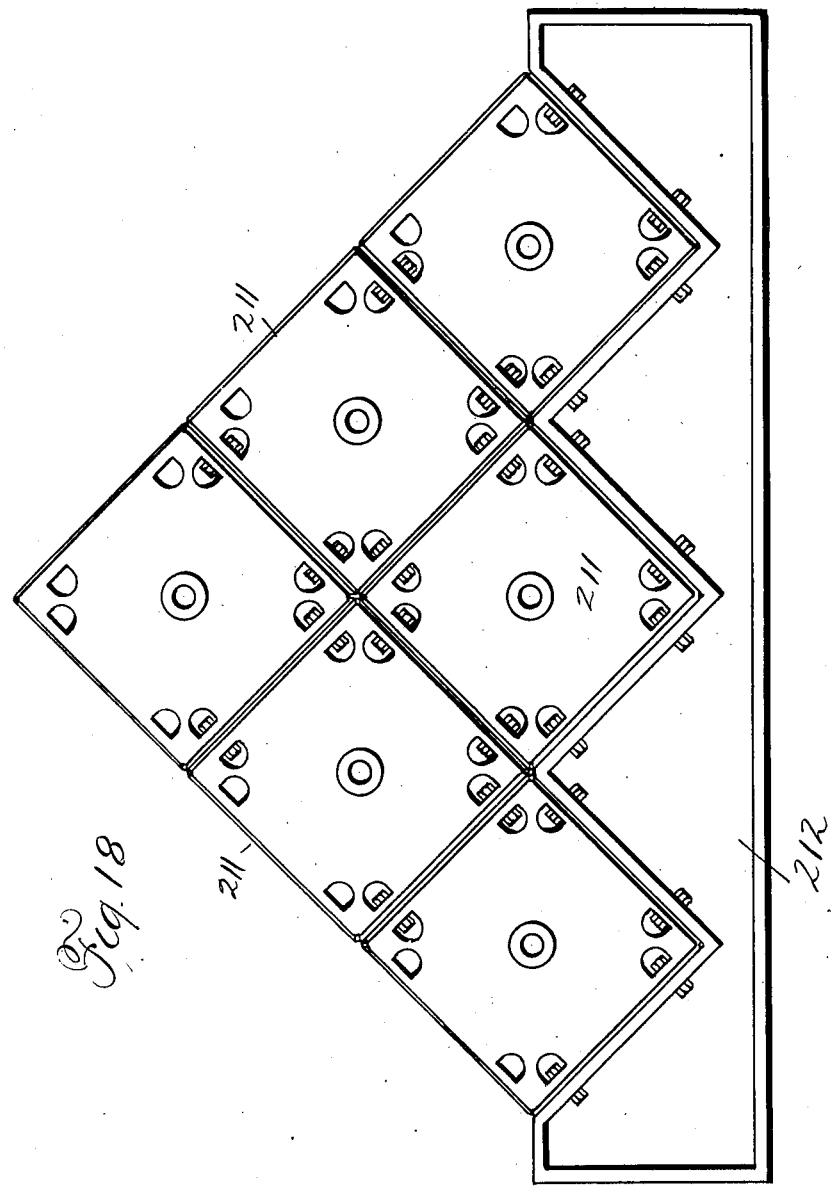

June 12, 1928.  W. W. POTTER  1,673,088
MACHINE TOOL
Filed Dec. 11, 1923   13 Sheets-Sheet 13
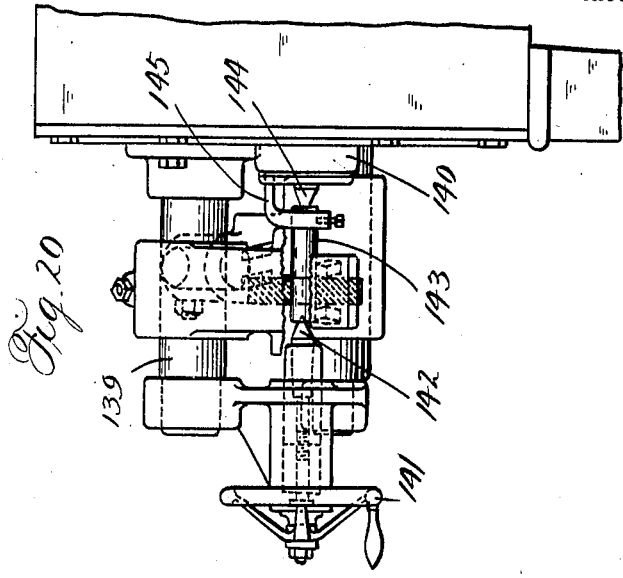
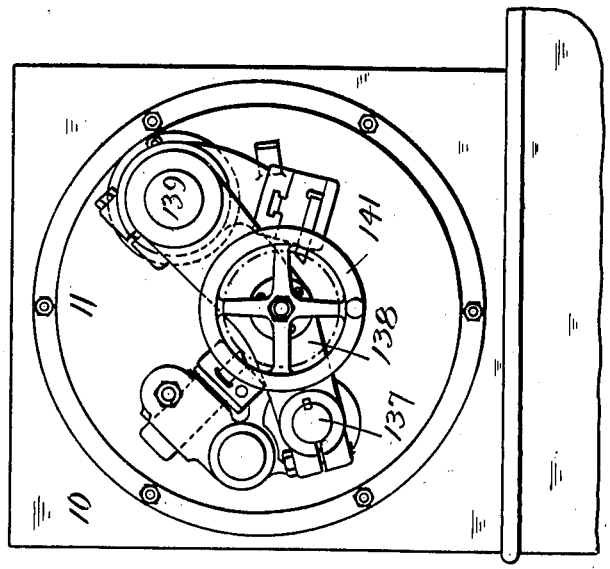
INVENTOR
W. W. Potter
BY
Chas. J. Williamson
ATTORNEY Patented June 12, 1928.

1,673,088

UNITED STATES PATENT OFFICE.

WILLIAM WALLACE POTTER, OF PAWTUCKET, RHODE ISLAND.

MACHINE TOOL.

Application filed December 11, 1923. Serial No. 679,965.

Multi-spindle machine tools have the serious disadvantage that if one of the spindle units become disabled the whole machine must be stopped for the repair of that one spindle. This may be a serious thing in these days of rapid production as the manufacturer can ill afford to dispense with the whole machine. Sometimes to meet the situation the manufacturer will remove the whole machine and substitute for it another machine but obviously this is a very expensive way of dealing with the situation. Again the present needs of a manufacturer may not require so elaborate a machine and yet in anticipation of future needs he may purchase one beyond his present needs and with parts for which he may have no use until some future time and thus have his capital needlessly tied up. Very often his present needs may be filled by what is called a "single purpose machine". The object of my invention is to provide a machine tool which will obviate the disadvantages of the multiple spindle machine, and which will fill the needs for a single purpose machine and a multi-spindle machine and thus avoid retarded production and the present investment of capital to a larger amount than is required by present needs. My invention consists in whatever is described by or is included within the terms or scope of the appended claims.

In the annexed drawings:

Fig. 1 is a front elevation of a machine tool comprising a collection of assembled units embodying my invention;

Fig. 2 is an end elevation thereof;

Fig. 3 is a side elevation of one of the units;

Fig. 5 is a rear elevation of one unit;

Fig. 6 is a longitudinal section of one of the units with the outside casing omitted;

Figure 4:
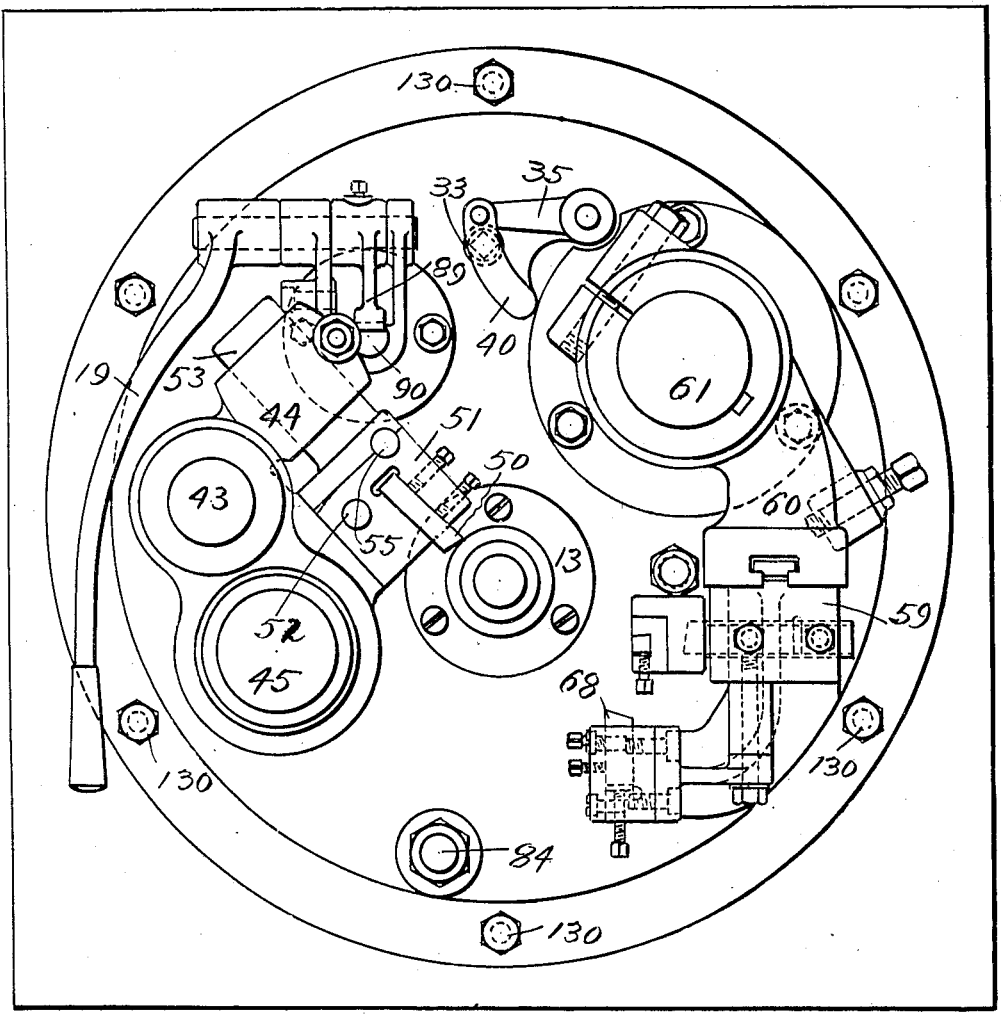
Fig. 4 is a front elevation thereof.

Fig. 6ᵃ is a detail bottom view of the housing key;

Fig. 7 is a detail view in longitudinal section of the pneumatic work-holder mechanism;

Fig. 7ᵃ is a detail view of the chuck clamp.

Fig. 8 is a cross section on the line 8—8 of Fig. 6 with some parts omitted for clearness of illustration;

Figs. 9 and 10 are respectively plan views of the lower and upper halves of the cylindrical casing of a unit with the mechanism supported therein;

Fig. 9ᵃ is a detail view of the feed disconnecting device;

Fig. 11 is a longitudinal section of enough of a unit to show the controlling mechanism for starting and Fig. 11ᵃ is a detail view of part thereof;

Fig. 12 is a detail top plan view of a portion of the machine showing the assembly of tools;

Fig. 13 is a detail view in section of the turning tool holder;

Fig. 14 is a detail top plan view thereof;

Fig. 15 is an elevation showing the procedure in removing the mechanism of a unit from its container;

Fig. 16 is a front end elevation of a part thereof;

Fig. 17 is a detail view showing electric devices for chucking the work instead of air;

Fig. 18 is an end elevation showing a different assembly of units in which a square instead of a round or cylindrical casing is used;

Figs. 19 and 20 are detail views showing a machine unit for turning work on centers.

A fundamental principle or idea of my invention is the construction of units, each comprising a spindle and properly supported tools and a motor which by suitable gearing revolves the spindle and feeds the tools so that any number thereof within reason may be assembled so as to constitute a multi-spindle machine, any one of which not including its motor, preferably, may be removed from the assembly without in any degree or fashion impairing the usefulness of those that remain, and growing out of this idea is the possibility of starting with a single unit which may be considered as a single purpose machine and adding thereto to produce the multi-spindle organization as the requirements of the manufacturer necessitate. I give to the unit such form that no room or space is wasted which is important first in conserving floor space and, second, in diminishing the walking required by the workman in placing work in and removing it from the machine and to effectuate this important object the units are so designed that the workman does not have to stand at the side of the machine or at the side of the chuck as is ordinarily the case but he stands facing the chuck or spindle endwise and the chucks and the tools of an assembly of units are presented in the same direction that is to say all lie in a plane transverse of the spindle or chuck axis.

I have chosen for illustration of my invention a machine for turning pistons for gas engines but it is to be understood that I do not restrict myself to that particular embodiment of my invention unless the claims specifically require it and it will be found that some of my claims are drawn to cover features of construction especially advantageous in turning pistons or piston rings.

Proceeding now with a description in the detail of what is shown in the drawings and referring first to what appears in Figs. 1 to 17 it will be found that each unit includes a cubical frame or housing, 10, which is square in cross section so that the units when assembled may stand side by side with adjacent sides in contact and in tiers with the flat bottoms of an upper tier resting upon the flat tops of those below. Each frame, 10, has a cylindrical chamber through it from front to back and within it is closely fitted a cylindrical casing, 11, within which is the spindle, 12, which outside the casing at the front has a chuck, 13, and supported around the chuck on the front wall of the casing are the various tools and such control levers or devices as the workman must manipulate. Upon a bracket, 14, extending from the rear wall of the unit is an electric motor, 15, from which power is taken to revolve the spindle and to put the tools through their cutting and idle motions. On the armature shaft of the motor is a pinion, 16, which meshes with a gear, 170, loose on the main shaft, 17, which by a friction clutch, 18, is connected with or disconnected from the main shaft, said clutch being under the control of a hand lever, 19, at the front end of the machine units, and certain automatic stop devices all as hereinafter explained. Keyed to the main shaft, 17, within the cylindrical casing is a pinion, 171, which meshes with a gear, 120, keyed to the spindle and thereby the spindle is revolved.

The spindle is supported at each end of the cylindrical casing in a solid box, 20, integral with the end wall of the casing (the latter being made in halves that are joined on a horizontal plane passing through the spindle axis which suitably are connected together. Each spindle bearing, 20, is a solid box that is to say not a split box because it is not feasible of assembly and to make the solid box a thoroughly practicable bearing even when made of cast iron the box is treated to give its spindle engaging surface the necessary hardness and smoothness such treatment being first chilling then grinding and finally wedging the hole to size and producing a polished bearing surface.

Mounted concentric with the spindle is the cam drum 21, which imparts the feeding movement to the turning tool which turns the periphery of the piston and a profile cam, 22, which imparts or controls the movement of the cross tool and the differential gear, 23, the driven gear member of which is keyed to one end of the cam drum and thus a very compact organization is secured. Interposed between the spindle and these members that are concentric therewith is a sleeve, 24, that supports them and thus no strain from them falls upon the spindle.

The differential carrier gear meshes with and receives motion from a pinion, 25, slidable upon a shaft, 26, which when slid into engagement with a clutch, 27, keyed to the shaft, 26, is revolved from said shaft. The shaft, 26, by change gears, 28 and 29 the latter on the main shaft, 26, receives its motion to drive the cam drum and profile cam by power. Upon the end of the shaft, 26, is a pinion, 30, (see Figs. 6 and 9) which when the pinion, 25, is shifted from the clutch, 27, is placed in mesh with a pinion, 31, by the shifting of the latter on a shaft, 32, mounted in bearings within the casing, 11, which has its outer end provided with a square hole, 33, into which a crank may be inserted through a hole in the end wall of the casing and thereby the shaft, 32, rotated. By means of a coil spring, 34, on the shaft, 32, the pinion, 31, is held in a position where it will not mesh with the pinion, 30, and by endwise pressure from the crank applied to the shaft, 32, the pinion, 31, may be placed in mesh with pinion, 30, and the feed cams revolved by hand. The sliding movement of pinion, 25, into and out of engagement with clutch, 27, is produced from the front of the machine by a crank, 35, thereat connected with a rod or shaft, 36, which has a yoke, 37, that straddles the pinion, 25, so that by turning of the crank, 35, in one direction and by the action of a cam, 38, the rod, 36, will be moved longitudinally and the disengagement of the pinion, 25, and clutch, 27, effected. When the crank, 35, is moved in the opposite direction a spring, 39, on the rod, 36, moves the latter to place the pinion, 25, and clutch, 27, again in engagement. The crank, 35, has a tail, 40, which so long as the pinion 25, and clutch 27, engage covers the hole, 33, in shaft, 32, for the application of the crank and thus makes it impossible for injury to a workman from placing the crank in the shaft, 32, to turn the latter by hand so long as the power drive is connected up, and said tail, 40, when the crank is applied to the shaft prevents placing pinion, 25, and clutch 27, in mesh so that the workman is safeguarded in that case.

The cam drum, 21, has on its periphery cams, 41, which (see Fig. 10) engage a roller, 42, on a longitudinally slidable rod, 43, which passes through the cylindrical casing and outside the latter carries the turning tool holder, 44, which is slidable on a bar, 45, mounted on the casing front and the cams act only to impart feeding movement to the tool, return movement being produced by a coil spring, 46, upon the rear end portion of the rod, 43, which at one end bears against a stationary part on the casing and at the other end against a collar, 47, on the rod so as to tend to move the rod forward. By the employment of the spring to retract the turning tool instead of a cam on the drum the diameter of the cam can be materially reduced compared to what it would be if the retraction of the tool should be effected by the cam, the feeding cams can be given a slope that produces an easy and powerful action on the tool and a quicker return of the tool can be secured as the cam surface, 49, which controls such return can be quite abrupt and yet be closely followed up by the spring. The spring return has the further advantage that it makes unnecessary any mechanism for speeding up the cam drum for quick return of the tools. It is to be understood, however, that a construction embodying my invention in other respects may be employed in which the return movement of the cutting tools will be produced by cams.

It will be observed that the cutting action of the turning tool is a pull or drawing action and not a pushing one and which for obvious reasons is preferable to a pushing action and this is one of the incidental results from my arrangement which locates the chuck and the tool so that they stand endwise to the operator at the front of the machine. I do not limit myself to the pulling action on the cutting tool as instead a pushing action may be employed although the latter is generally not desirable.

A turning tool or tools, 50, are mounted on the holder, 44, there being two such tools in the case of the work shown which is a piston, one of these tools turning a portion of the piston to a less diameter than the other and said tools are mounted upon a block, 51, (see Figs. 4 and 12 to 14) which is hinged or pivoted by a pin, 52, to a post, 53, mounted on the holder, 44, so that by the swinging of the block, 51, the tools, 50, may be moved to and from cutting position. Between adjacent flat faces of the block, 51, and post, 53, are the halves of a hole, 54, which tapers and in such hole is a taper slidable pin, 55, whose smaller end is towards the face of the casing, 10, which is connected by a chain, 56, or other flexible connection with the front wall of the casing so that when the tool holder moves far enough to take up the slack of the chain the taper pin, 55, will wedge the block, 51, away from the post. 53, and press the block against a rigid support or thrust surface, 57, so as rigidly to support the turning tools, 50, in cutting position. When the tool holder, 44, has carried the tools, 50, over the work and completed the cut the small end of the taper pin, 55, will strike the end of a post, 58, projecting from the front wall of the casing, 10, and the taper pin will be thrust backward and allow the block, 51, to swing on the pivot, 52, under the pressure of a spring, 59, and thereby move the cutting tools, 50, to a position where they will not touch or drag over the work on the return movement.

Besides the turning tools, 50, the equipment for turning the piston shown in the drawings includes certain tools mounted in a cross cutting holder, 59, (see Figs. 4, 9 and 12) which is mounted upon an arm, 60, fixed to a rock shaft, 61, projecting from the casing at the front of the machine which rock shaft within the casing, 11, has an arm, 62, with a roller, 63, which is held by a spring, 64, in contact with the periphery of the profile cam, 22, such cam having the contour best shown in Fig. 8. The cross cutting tool equipment as best shown in Fig. 12 includes a tool 64, for facing the end of the piston, chamfering tools, 65 and three grooving tools, 66. On a bracket, 67, attached to the holder, 59, a skiving tool, 68, (best shown in Fig. 4) is mounted which is adjusted to remove the scale off the rough piston casting before the grooving tool 66, which cuts groove G can contact with the work. Without the skiving tool, 68, to do this roughing cut the grooving tool, 66, referred to would operate on the rough casting because such grooving tool would reach the work before the turning had been carried to that point by the foremost one of the turning tools, 50, with the result that such grooving tool would have its edge taken off and which would prevent it cutting the proper width. As an alternative should the skiving tool, 68, not be used it would be necessary to wait the complete turning of the periphery of the work by the turning toil, 50, before allowing the grooving tool to do its work which would mean that more time would be required for finishing the work.

The chuck or work holder for turning the piston shown in the drawings is a cylindrical block fixed to the end of the spindle, 20, and the open end of a piston is placed over a shoulder upon the outer face of such block and the piston is rigidly held thereto by a transversely extending pin, 69, which is inserted in the diametrically opposite trunnion holes of the piston which pin at midlength passes through an alining hole in a rod, 70, which extends longitudinally through the spindle and is capable of longitudinal movement therein either inward to tightly draw the piston against the chuck or outward to release the piston. A spring pressed latch, 71, in the rod, 70, engages an annular groove, 72, at midlength of the pin to center the latter in the piston and to latch it from dropping out. At the opposite or rear end of the unit and outside thereof the rod, 70, has a shoulder, 73, which on one side is engaged by a pair of levers, 74, pivoted to an extension, 75, of the spindle on diametrically opposite sides which when spread apart by a sliding cone, 76, mounted on the spindle extension will move the rod, 70, in the direction to clamp the piston to the chuck, movement of the rod, 70, in the opposite direction being produced by a spring, 77, within the spindle extension, 75, around a prolongation, 78, of the rod, 70, which prolongation is preferably screwed to the rod, 70, for purpose of adjustment. The cone, 76, is moved in the direction to spread the levers, 74, by a lever, 79, which at one end is connected to the piston rod, 80, of a piston. 81, in a cylinder, 82, to either end of which alternately air coming through a pipe, 820, is supplied, the admission of the air alternately to opposite ends of the cylinder being under the control of a piston valve, 83, from which a rod, 84, extends through the casing to the front of the machine where it is connected to a hand lever, 85, for the shifting of the valve by hand to control the admission of air to the cylinder. The movements of the valve are automatically produced by dogs, on the cam drum, 21, one dog, 86, acting on a pin, 87, on the rod, 84, (see Fig. 7) to move the valve, 83, to cause the movement of the rod, 70, to grip work to the chuck and the other dog, 88, acting on the opposite side of the pin, 87, to move the valve, 83, in the opposite direction to release the work from the chuck.

The mechanism for starting the machine by hand and automatically stopping it is best shown in Fig. 11. The hand lever, 19, mounted on the front of the unit casing as before explained has a gear segment, 89, which meshes with rack teeth, 90, in a longitudinally slidable bar, 91, which projects beyond the rear of the machine where it has a lateral projection 91*, that overlaps the end of a sleeve, 92, slidable on the bar 91, and which has rack teeth, 93, which mesh with a gear segment 94, on a lever, 95, which engages a collar, 96, slidable on the main shaft, 17, to operate the clutch 18. When the lever, 95, is moved to engage the clutch, 18, with the main shaft, 17, the parts are locked in such position by a spring pressed dog, 97, which moves into a slot, 98, in the sleeve, 92, the sleeve, 92, when in such position placing under compression a spring, 99, which tends to move the sleeve in the opposite direction. To the bar, 91, is pivoted a dog, 100, in the path of a lug, 101, on the side of the profile cam which lug on the completion of the cycle on motion engages the dog, 100, and moves the bar, 91, in the direction to slide a key 102, in the shaft within the sleeve, 92, in the direction to engage a bevel surface on such key with the latch dog, 97, to lift the latter out of sleeve locking engagement and permit the sleeve to be moved by the spring, 99, to rock the lever, 95, in the direction to release the clutch, 18, and simultaneously expand a friction brake, 103, against a stationary surface, 104, on the end of the casing and thereby instantly stop the turning of the shaft, 17. When the lug, 101, completes movement of the shaft, 91, by its action on the dog, 100, the latter by a spring, 105, is moved sufficiently to place the lug and dog out of alinement in the direction in which the rod, 91, must be moved by the hand lever, 19, again to start the machine.

Oil for lubrication is supplied from a pipe, 106, which extends from end to end of the casing, 11, just within the top thereof which at points along its length has fine holes 107, from which the oil in fine streams or a spray is discharged the oil being supplied to one end of the pipe, 106, by a pipe, 108, on the outside of the casing, which extends to a pump, 109, of the meshing gear type, which is situated near the bottom of the casing and which is driven by a gear connection with the spindle driving shaft, 120. Oil from within the bottom of the casing is drawn into the pump by a pipe, 110, and the low-down location of the pump furnishes always enough oil in it to make priming unnecessary. The distribution of oil from the pipe, 106, is effected by rotating the pipe for which purpose it has a gear, 111, which by an intermediate gear, 112, in mesh with a gear, 113, on the clutch, 27, receives motion from the latter. To enable it to be known by sight whether the oil is circulating I place beneath the pipe, 106, near one end a funnel, 114, which leads to a glass tube, 119, on the front of the casing, 11, from the bottom of which tube a pipe 119*, extends from the inside of the casing to deliver the oil flowing into and from the glass tube back into the casing.

The spindle bearings are shown as provided with holes, 121 leading from the top for the passage of oil into the bearings and holes, 122, leading from the bottom for the discharge of oil from the bearings. It will be understood that joints or openings through which oil might pass outward are suitably packed.

Referring to Fig. 16, the procedure of removing the mechanism of a unit from an assembly is illustrated. As there shown an overhead crane, 123, is employed having two blocks and falls, 124, the hook of one of which is engaged with the eye of an iron, 125, which is attached to projecting members at the front of the unit and the latter slid from its container in the assembly until, is accessible an eye, 126, attached to the top of the unit at a point which will support the back end of the unit and the hook of the other block and fall is engaged with that eye. The eye 126 is removable so as not to obstruct the return of the unit into the casing. The unit casing preferably rides on rollers, 127, at the bottom of the casing. On the underside of the casing, 11, is a hardened steel strip, 128, which extends longitudinally thereof, and which has contact with the rollers, 127, and which by engaging a slot in the inner surface of the housing, 10, acts as a key to properly locate the mechanism within the housing. To permit the removal of the unit mechanism from the container a circular strap, 128, held by bolts, 130, (see Fig. 4) must be removed from the front end of the unit.

To take care of the chips which fall from the various units of the assembly as best shown in Fig. 1 there is a chute, 131 leading downward from near the bottom of each unit, the lowermost chutes delivering to a horizontal trunk, 132, in which is a screw conveyor, 133, driven from an electric motor, 134, and each of the upper chutes delivering its chip to the chute next below. The chutes are separately mounted so that only one opposite a unit need be removed to remove that unit.

Referring to Fig. 18 it will be seen that a housing corresponding with a housing, 10, is not employed and instead the external member is a square casing, 211, which like the casing, 11, of the other figures contains the mechanism; assembly of units in this case being as shown in Fig. 18 and the lowermost units resting in notches in a base 212.

In Fig. 17 I show an arrangement of two solenoids, 135, for operating the workholder clamp instead of air, the cores of the solenoids being connected with the lever, 179, that moves the cone, 176, to spread the levers, 174, which move the clamping rod which passes through the spindle and the two solenoids being in circuits which includes switches, 136, for the respective solenoids that are actuated by dogs on the cam drum as in the case of the pneumatic device, but the dogs are so formed that after the circuit has been closed long enough to energize the solenoids to shift the lever, 179, they will be broken to avoid waste of current.

Referring to Figs. 19 and 20 I illustrate a unit adapted for turning work on centers. To the non-rotating arm, 137, which slidably supports the turning tool carrier in piston turning arrangement I secure a bracket, 138, and also supported upon an extension, 139, of the rock shaft of the cross cutting tool carrying arm in which bracket in alinement with the center of a spindle 14, I mount a hand wheel, 141, which acts upon the center, 142, to confine an arbor, 143, against the spindle supported center, 144. Engaging the spindle is a dog, 145, clamped to the arbor.

What I claim is:

1. A machine tool comprising a work spindle and a tool carrier or carriers and a casing that comprises an external member chambered from end to end and a member within such chamber supporting the spindle and tool carrier or carriers and removable endwise with the parts supported thereby from the external casing member, the external casing member having an outside configuration for juxtaposition with a similar organization.

2. A machine tool comprising a work spindle and a tool carrier or carriers and a casing that comprises an external member chambered from end to end and a member within such chamber supporting the spindle and tool carrier or carriers and removable endwise with the parts supported thereby, from the external casing member, the external casing member having an outside configuration for juxtaposition with a similar organization, the casing member within the chambered member being a shell of separable parts.

3. A machine tool comprising a work spindle and a tool carrier or carriers and a casing that comprises an external member chambered from end to end and a member within such chamber supporting the spindle and tool carrier or carriers and removable endwise with the parts supported thereby, from the external casing member, the external casing member having an outside configuration for juxtaposition with a similar organization, the casing member within the chambered member being a shell of separable parts, one of said parts having solid bearing boxes for the spindle.

4. A machine tool comprising a work spindle and a tool carrier or carriers and a casing that comprises an external member chambered from end to end and a member within such chamber supporting the spindle and tool carrier or carriers and removable endwise with the parts supported thereby, from the external casing member, the external casing member having an outside configuration for juxtaposition with a similar organization, and means for delivering a lubricant within the inner casing.

5. A machine tool comprising a hollow casing containing certain running elements of the machine and means for spraying a liquid lubricant into such casing, the casing completely enclosing the spraying means and said running elements.

6. A machine tool having a hollow casing containing certain moving parts of the machine and a rotatable liquid lubricant containing member within the casing having a lubricant outlet which by the rotation thereof is directed in different radial directions.

7. A machine tool having a hollow casing containing certain moving parts of the machine and a rotatable liquid lubricant containing member within the casing having a lubricant outlet which by the rotation thereof is directed in different radial directions, said outlet comprising a plurality of holes.

8. A machine tool comprising a spindle and a tool carrier or carriers, rotating tool feed means mounted concentric with the spindle and a tubular support for said tool feed means surrounding the spindle out of contact therewith.

9. A machine tool comprising a spindle and a tool carrier or carriers and rotating tool feed means mounted concentric with the spindle, and means supporting said tool feed means independently of the spindle.

10. A machine tool comprising a spindle and a tool carrier or carriers and rotating tool feed means mounted concentric with the spindle, and comprising a differential gear, a cam drum and profile cam, and a sleeve supporting the same through which the spindle passes without contact.

11. A machine tool comprising a work spindle and a reciprocating tool carrier, a tool feed comprising a cam drum and a spring acting to move the tool carrier in opposition to the drum, and a casing with a cylindrical interior into which the tool carrier extends and upon which within the casing the spring acts.

12. A machine tool comprising a work spindle and a reciprocating tool carrier and tool feeding means to pull the tool over the work, and a casing within which the tool carrier extends and within which the tool feeding means is situated, said means comprising a cam and a spring acting in opposition.

13. As an improvement in machine tools, a unit having its own spindle and tool carrier or carriers, and a frame or casing that is polygonal in cross section with its side and top and bottom surfaces plane and adapted to lie flat against the corresponding exterior surface of a similar unit, the front and rear of the unit, respectively, exposing the work holder and the tool carrier or carriers, and driving means.

14. As an improvement in machine tools, a unit comprising an outer casing, an inner casing removable and replaceable, said inner casing being of several separable sections and the respective sections carrying certain of the moving elements of the tool.

15. A machine tool comprising a casing with horizontal top and vertical side and end walls, a work spindle, a tool carrier and a rotary cam drum all within the casing and below the top thereof and with their axes extending horizontally, the tool holder of the carrier and the work-holding end of the spindle being all on the exterior of one of the end walls of the casing, main drive means, gear connections from such means within the casing below the top thereof with the spindle and with the cam, and a drive connection between the cam and the tool carrier also within the casing and below the top thereof.

16. A machine tool comprising a casing with horizontal top and vertical side and end walls, a work spindle, a tool carrier and a rotary cam drum all within the casing and below the top thereof and with their axes all extending horizontally, the tool holder of the carrier and the work-holding end of the spindle being on the exterior of one of the end walls of the casing, main drive means, gear connections from such means within the casing below the top thereof with the spindle and with the cam and a drive connection between the cam and the tool carrier also within the casing and below the top thereof, said main drive means including a motor external to and immediately adjacent said casing and the gear connection between the same and said elements within the casing including means that reach through a casing wall.

17. A machine tool comprising a casing with horizontal top and vertical side and end walls, a work spindle, a tool carrier and a rotary cam drum all within the casing and below the top thereof and with their axes all extending horizontally, the tool holder of the carrier and the work-holding end of the spindle being on the exterior of one of the end walls of the casing, main drive means, gear connections from such means within the casing below the top thereof with the spindle and with the cam, a drive connection between the cam and the tool carrier also within the casing and below the top thereof, and lubrication means comprising an oil pump situated outside the casing and piping extending from the pump on the outside of the casing and reaching to the top of the casing and extending thereat into the casing and having an outlet within the casing above the spindle, tool carrier and cam drum.

In testimony whereof I hereunto affix my signature.

WILLIAM WALLACE POTTER.